US007804418B2

(12) United States Patent
Sullivan et al.

(10) Patent No.: US 7,804,418 B2
(45) Date of Patent: Sep. 28, 2010

(54) VEHICLE LIGHT ASSEMBLY AND MANUFACTURING METHOD

(75) Inventors: Lester R. Sullivan, Wyoming, MI (US); Todd M. Nykerk, Holland, MI (US); Bruce L. Reniger, Alto, MI (US)

(73) Assignee: Ventra Greenwich Holdings Corporation, Warren, MI (US)

( * ) Notice: Subject to any disclaimer, the term of this patent is extended or adjusted under 35 U.S.C. 154(b) by 556 days.

(21) Appl. No.: 11/708,129

(22) Filed: Feb. 20, 2007

(65) Prior Publication Data

US 2007/0193085 A1 Aug. 23, 2007

Related U.S. Application Data

(60) Provisional application No. 60/775,374, filed on Feb. 21, 2006.

(51) Int. Cl.
*G08B 5/00* (2006.01)
(52) U.S. Cl. .................. 340/815.4; 340/515; 340/469; 362/551; 362/23
(58) Field of Classification Search ............... 340/815.4, 340/815.45, 479, 471–476, 488, 515, 468–469; 362/551, 559, 582, 326, 327, 317, 23, 26–27
See application file for complete search history.

(56) References Cited

U.S. PATENT DOCUMENTS 4,603,065 A * 7/1986 Mori et al. ................. 428/31
4,882,565 A * 11/1989 Gallmeyer ................. 340/461
5,120,120 A * 6/1992 Cohen ....................... 351/161
5,243,194 A * 9/1993 Sano et al. ............... 250/461.1
5,383,039 A * 1/1995 Smith ........................ 359/13
5,510,869 A * 4/1996 Affolter et al. ............. 396/518
5,571,277 A * 11/1996 Allred et al. ............... 362/459
5,882,108 A * 3/1999 Fraizer ..................... 362/293
5,997,161 A * 12/1999 Stringfellow et al. ....... 362/489
6,356,376 B1 * 3/2002 Tonar et al. ................ 359/267
6,522,472 B1 * 2/2003 Green ....................... 359/630
6,557,284 B2 * 5/2003 Nolan ........................ 40/574
7,213,757 B2 * 5/2007 Jones et al. ............. 235/462.01
7,347,576 B2 * 3/2008 Wang et al. ................ 362/23
2006/0191206 A1 * 8/2006 Mooney et al. ............. 49/502

FOREIGN PATENT DOCUMENTS

DE 43 41 825 A1 6/1994

OTHER PUBLICATIONS

European Office Action dated Dec. 12, 2008 in corresponding European Application No. 07751033.7 (4 pages).

* cited by examiner

*Primary Examiner*—Daniel Previl
(74) *Attorney, Agent, or Firm*—Pepper Hamilton LLP

(57) ABSTRACT

A lens for a vehicle light assembly includes at least one ink marking provided thereon. At least a portion of the ink marking is configured such that it appears generally opaque to a viewer when a light source in the light assembly is not illuminated and does not appear opaque when the light source is illuminated. The ink marking includes an ink composition that includes a transparent ink and a pigmented ink.

24 Claims, 6 Drawing Sheets

VEHICLE LIGHT ASSEMBLY AND MANUFACTURING METHOD

CROSS-REFERENCE TO RELATED PATENT APPLICATIONS

This application claims the benefit under 35 U.S.C. §119(e) of U.S. Provisional Patent Application No. 60/775,374 filed Feb. 21, 2006, the entire disclosure of which is incorporated herein by reference.

BACKGROUND

The present invention relates generally to the field of light assemblies for use in vehicles such as automobiles. More particularly, the present invention relates to the application of markings (e.g., logos, emblems, designs, graphics, etc.) to lenses used in such light assemblies.

Lighting or lamp assemblies for vehicles (e.g., rear center high mounted stop lights (CHMSL)) include a housing, a light source such as an incandescent bulb or light emitting diodes (LEDs), and a lens. In braking or stop light applications, the lens is typically formed of a red or clear transparent or translucent polymeric material.

It may be desirable to provide markings on the lenses of lighting assemblies for decorative purposes. For example, if a particular logo or emblem is associated with the vehicle on which the lighting assembly will be used, it may be desirable to include this logo on the lens of the CHMSL for the vehicle.

One issue associated with the application of markings to vehicle braking or stop light assemblies is that such light assemblies must meet certain photometric requirements relating to the amount of light emitted when the vehicle brake is depressed. For example, current U.S. federal regulations require that a CHMSL have 4.5 square inches of total illumination surface. If a marking applied to a CHMSL lens is formed of an opaque material that does not allow a sufficient amount of light to pass therethrough, the size of the CHMSL lens must be increased to ensure that the CHMSL has sufficient illumination surface area to meet the government regulations. This, in turn, may undesirably increase the total cost of the CHMSL assembly. Moreover, light sources may have to be specially designed to avoid being blocked by an opaque marking.

Another concern is that light sources used in the light assemblies are intended to emit a specified beam strength. A marking on the lens may have the effect of reducing the effective area of the lens and could effectively block some of the light emission, resulting in a reduced beam strength. Thus, designers may be forced in such situations to use a larger or more powerful light source to maintain the same beam strength.

Accordingly, it would be desirable to provide a light or lamp assembly that includes one or more markings applied to a lens thereof. It would also be desirable to provide graphics that do not detract from the illumination area of the lens. It would further be desirable to have a relatively simple and efficient method of applying such markings to the lens surface. It would be advantageous to provide a light or lamp assembly and method of producing such an assembly that includes any one or more of these or other advantageous features as may be apparent to those reviewing this disclosure.

SUMMARY

An exemplary embodiment relates to a lens for a vehicle light assembly includes at least one ink marking provided thereon. At least a portion of the ink marking is configured such that it appears generally opaque when a light source in the light assembly is not illuminated and does not appear opaque when the light source is illuminated.

Another exemplary embodiment relates to a lighting assembly that includes a light source, a lens, and a marking provided on the lens. The marking comprises an ink that appears opaque until the light source is activated. The ink is configured to allow at least a portion of the light from the light source to pass through the marking.

Another exemplary embodiment relates to a method for producing a lighting assembly that includes providing an ink composition comprising a transparent ink and a pigmented ink and applying the ink composition to a surface of a lens. The ink is configured to appear opaque until lit by a light source and to allow at least a portion of the light from the light source to pass through the ink

DETAILED DESCRIPTION

According to an exemplary embodiment, a light or lamp assembly includes a lens having one or more markings (e.g., logos, designs, emblems, graphics, text, etc.) provided thereon. The markings are advantageously formed using a material (e.g., an ink) that appears generally or substantially opaque (e.g., with substantially no light from behind the marking visible to the observer) until it is backlit by a light source (e.g., a bulb, light emitting diode (LED), or other light-producing means), at which point the material becomes translucent or otherwise allows at least a portion of the light to pass through the marking.

Figure 1:
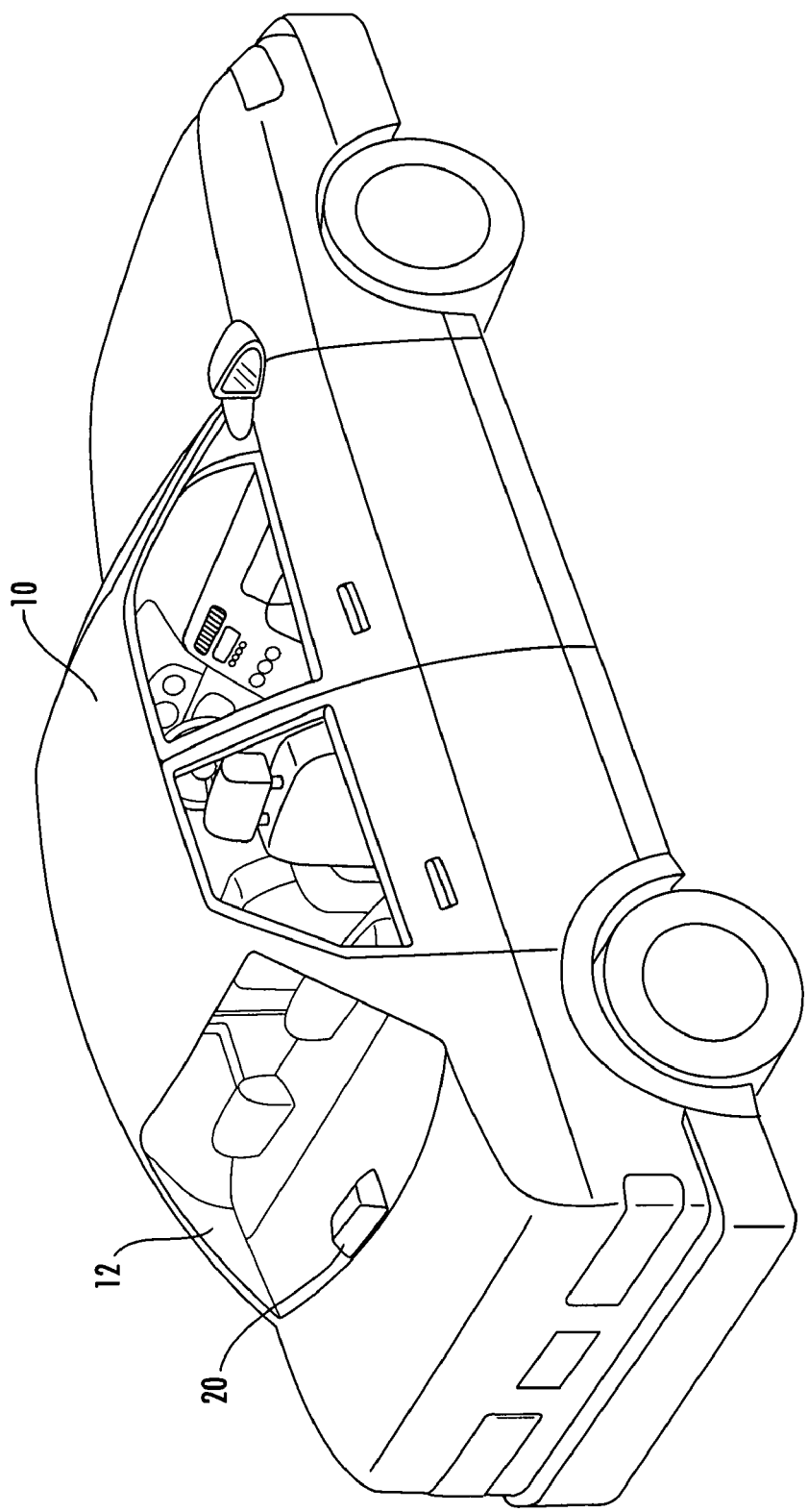
FIG. 1 is a perspective view of a vehicle having a lighting assembly according to an exemplary embodiment.

FIG. 1 illustrates a vehicle 10 having a lighting assembly 20 provided near the bottom of a rear window 12 of the vehicle 10. According to other exemplary embodiments, the lighting assembly may be provided at other locations, such as toward the top of the rear window 12. According to still other exemplary embodiments, the concepts described herein may be applicable to other vehicle lighting assemblies, such as vehicle tail light assemblies, turn signal assemblies, headlight assemblies, interior light assemblies, and the like. For example, vehicle nameplates or emblems (e.g., logos, etc.) may be applied to exterior vehicle lights instead of or in addition to separate nameplates or emblems provided on an exterior surface of the vehicle. As shown in FIG. 1, the lighting assembly 20 is provided in the form of a brake light such as a center high mounted stop light (CHMSL).

Figure 2:
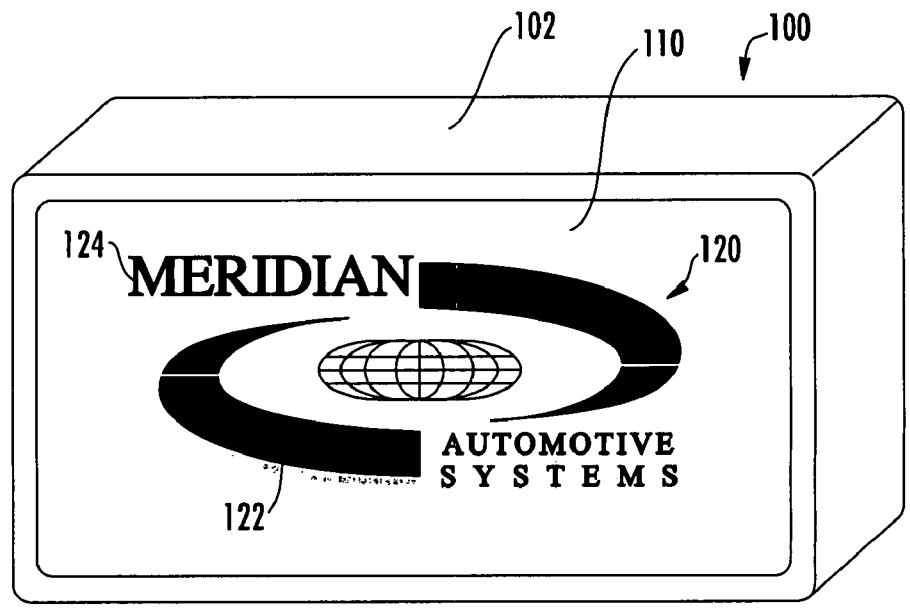
FIG. 2 is a perspective view of a lighting assembly according to an exemplary embodiment.

Referring to FIG. 2, a lighting assembly 100 includes a housing 102, a light source (not shown) provided within the housing, and a lens 110. The light source may be a bulb (e.g., an incandescent bulb), one or more light emitting diodes (LEDs), or any other suitable light source now known or hereafter developed. The characteristics of the light source (e.g., intensity, color, etc.) may vary according to various other exemplary embodiments, and may be selected for a particular application based on any of a variety of factors.

According to an exemplary embodiment, the lens is made of a generally translucent or transparent polymeric material such as polymethylmethacrylate (PMMA), polycarbonate, nylon, or other suitable polymers. According to another exemplary embodiment, the lens is made of glass. The lens may be colorless or may be colored according to various exemplary embodiments (e.g., the lens may be red, orange, yellow, blue, or any other suitable color or combination of colors). According to other exemplary embodiments, the lens may include both colorless and colored portions (e.g., a colorless portion and a red portion).

While FIG. 2 illustrates a lighting assembly 100 having a generally rectangular configuration, the lighting assembly may have any of a variety of sizes, shapes, or configurations according to other exemplary embodiments. For example, FIG. 2 illustrates a lighting assembly 200 according to another exemplary embodiment having a housing 202 and lens 210 having a shield or badge style configuration.

According to an exemplary embodiment, the lighting assemblies 100, 200 are intended for use as center high mounted stop lights (CHMSLs) for use in vehicle applications. According to other exemplary embodiments, lighting assemblies similar to those shown in FIGS. 2 and 3 may be used in other applications (e.g., conventional rear tail lights, etc.).

Figure 3:
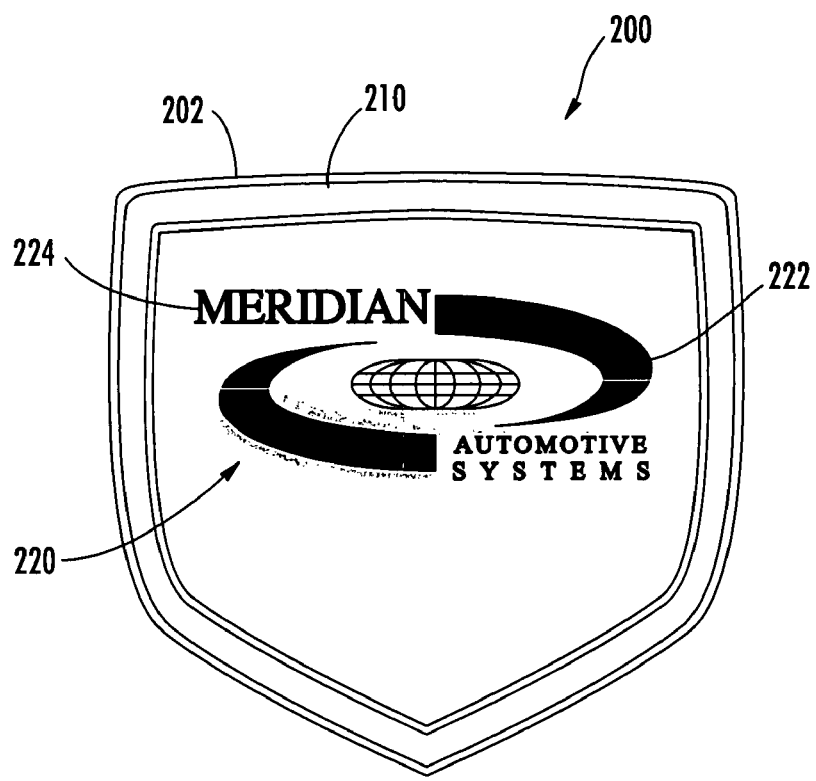
FIG. 3 is a perspective view of a lighting assembly according to another exemplary embodiment.

As shown in FIGS. 2 and 3, markings 120, 220 are provided on interior surfaces of the lenses 110, 120. According to other exemplary embodiments, markings may be applied to an exterior surface of a lens or both the interior and exterior surfaces of a lens. The markings 120, 220 may be provided in any desired color. According to a particular exemplary embodiment, a marking having a generally white or silver color is applied to a red lens, although those reviewing this disclosure will appreciate that any of a variety of other ink and lens color combinations are possible and are within the scope of the present disclosure.

The markings 120, 220 shown in FIGS. 2 and 3 include both graphical elements or designs 122, 222 and text elements 124, 224, and are intended as representative, non-limiting embodiments. It should be understood by those reviewing this disclosure that markings applied to lenses may have any desired design and may include graphical elements, text elements, or both graphical and text elements. The size, color, and position of the marking may also vary according to other exemplary embodiments, and all such variations are intended to be included within the scope of the present disclosure.

Figure 4:
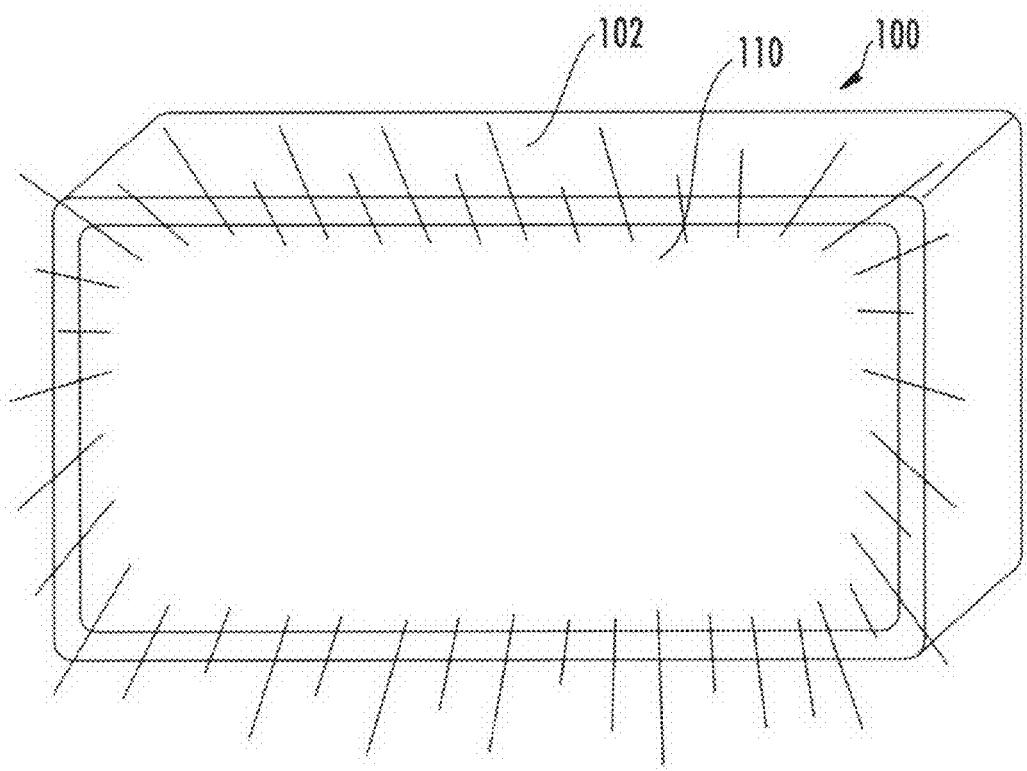
FIG. 4 is a perspective view of the lighting assembly shown in FIG. 2 with the marking shown as being substantially invisible upon being backlit.
Figure 5:
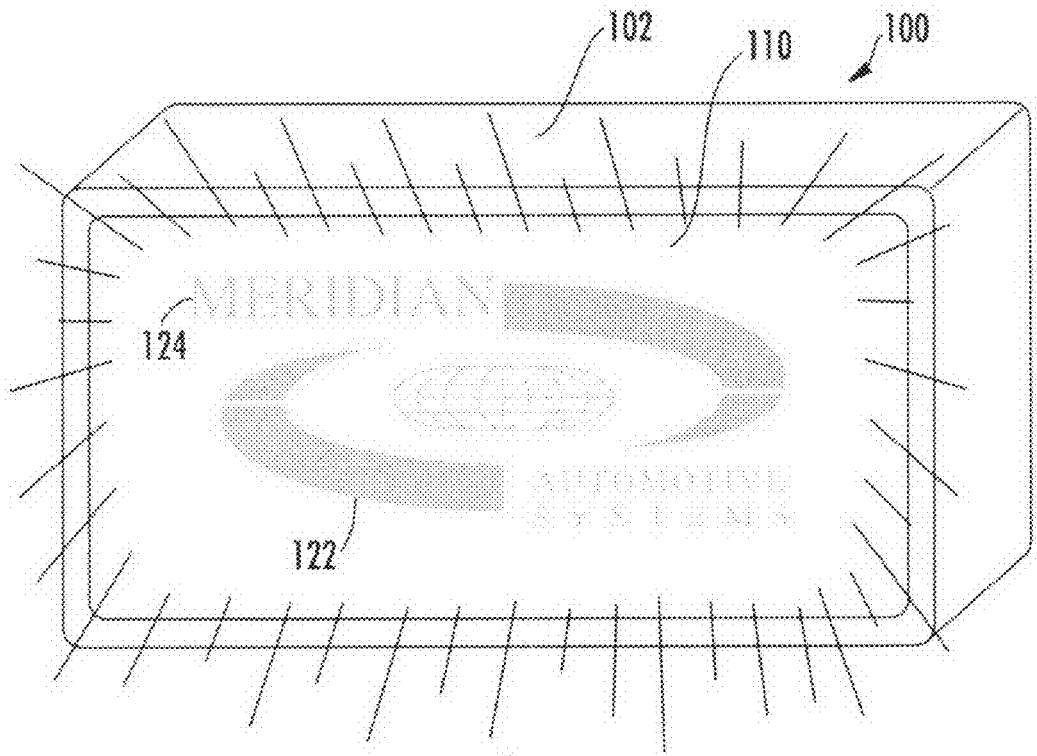
FIG. 5 is a perspective view of the lighting assembly shown in FIG. 2 with the marking shown as being faded upon being backlit.

According to an exemplary embodiment, the markings 120, 220 are provided on the lenses 110, 120 using a specially formulated material (e.g., an ink) that is intended to appear substantially opaque until it is backlit by a light source included in the lighting assembly. Once the light source is turned on, the marking becomes at least partially translucent or transparent to allow at least a portion of the light from the light source to pass through the marking such that it is visible to an observer of the lighting assembly. According to a particular exemplary embodiment, the marking is provided such that when the light source is activated, the marking appears to disappear to the human eye (see, e.g., FIG. 4, illustrating the assembly 100 shown in FIG. 2 with the marking substantially invisible to the observer upon being backlit by a light source). According to other exemplary embodiments, a portion (e.g., an outline) of the marking may remain visible to the human eye when the light source is activated. According to still other embodiments, the marking remains at least partially visible to the human eye, although it appears to be faded or less "solid" due to the light coming through the marking (see, e.g., FIG. 5, illustrating the assembly 100 shown in FIG. 2 with the marking partially faded to the observer upon being backlit by a light source).

It is intended that according to an exemplary embodiment, the ink does not completely block light from the light source from coming through the marking when it is activated. In other words, at least a portion of the light that is incident on the marking passes through the marking. The amount of light passing through the marking will depend on a number of factors, including the composition of the ink and the characteristics (e.g., intensity, color, etc.) of the light source, which may be varied to obtain the desired effect according to various exemplary embodiments. For example, by varying the ratio of the transparent and pigmented (i.e., colored) components used to prepare the ink, the amount of light that may pass through the marking may be varied. Different colored inks may also interact differently with light such that the amount of light allowed through the marking may vary (e.g., a composition with 60 percent green ink may allow a different amount of light to pass through the ink than one with 60 percent red ink). It should be understood by those reviewing this disclosure that many possible combinations of light sources and ink compositions are possible, and that all such combinations are intended to be within the scope of the present disclosure. According to one exemplary embodiment, at least 5 percent of the light incident upon the marking may pass through the marking to the eye of an observer. According to other exemplary embodiments, other percentages of light may be possible (e.g., at least 10 percent, at least 20 percent, at least 30 percent, at least 40 percent, at least 50 percent, at least 60 percent, at least 70 percent, at least 80 percent, at least 90 percent, at least 95 percent, or any other suitable percentage as may be desired in a particular application).

The ink and/or light source may be selected in order to allow the total amount of light emitted from a lighting assembly to meet a predetermined standard. For example, in a particular CHMSL application, the amount and/or intensity of light that is required to be emitted from the CHMSL may be subject to government standards. The size of the marking may be relevant to selecting the ink composition and/or light source used. For example, if the marking were relatively small in comparison to the total surface area of the lens for a particular application, less light may need to be allowed to pass through the marking, since the portions of the lens not covered by the marking may allow enough light to pass to the eye of the observer. In such a case, the ink may have a lesser proportion of transparent ink so that less of the light passes through the marking and/or the intensity of the light may be selected such that is lower than would otherwise be used. On the other hand, if the marking were relatively large in comparison to the total surface area of the lens, the marking may be configured to allow a greater amount of light to pass therethrough, since the remaining "uncovered" portion of the lens may not allow a sufficient amount of light to pass to the eye of the observer. In such a case, the proportion of transparent ink may be increased to allow a greater amount of light to pass through the marking and/or the light may be selected such that it has a greater intensity. Again, a large number of possible combinations, all of which are intended to fall within the scope of this disclosure, are possible.

Figure 6:
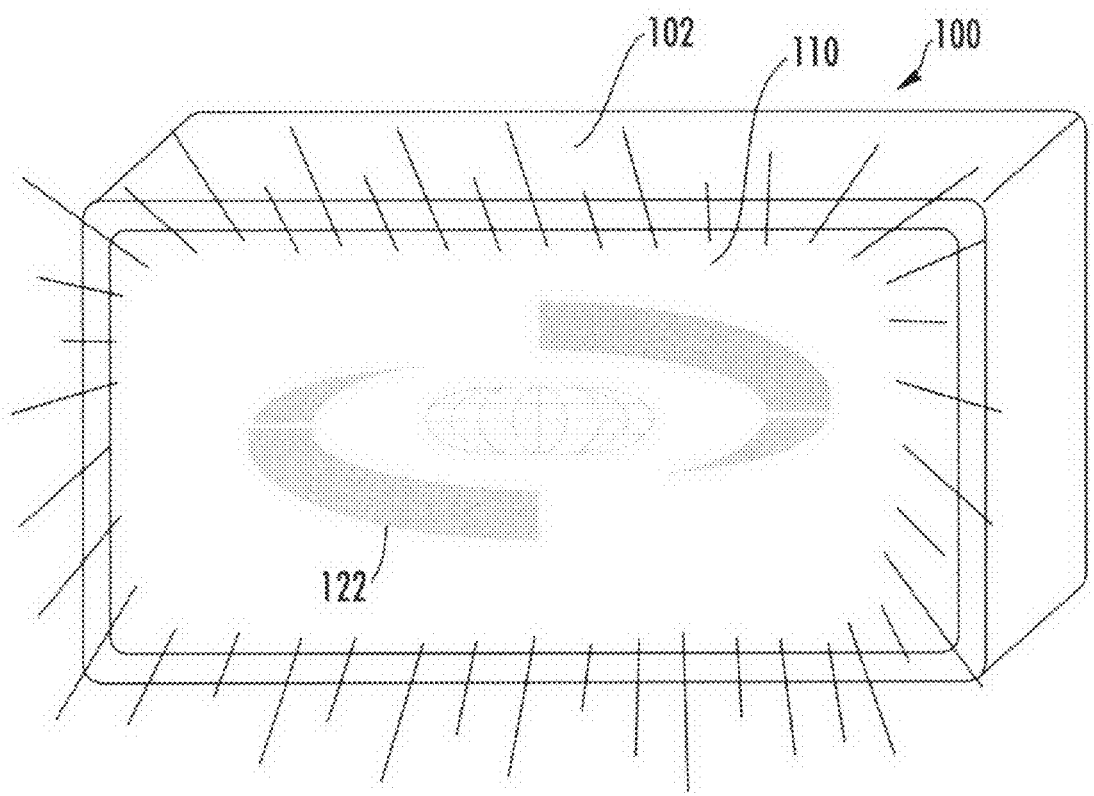
FIG. 6 is a perspective view of the lighting assembly shown in FIG. 2 with a portion of the marking being substantially visible and a portion of the marking shown as being faded upon being backlit.

According to yet another exemplary embodiment, various portions of the marking may be formed using different inks. For example, it may be desirable in a particular application if a portion of the marking fades away when illuminated, leaving another portion of the marking visible even when the light source is turned on. FIG. 6 illustrates the assembly 100 shown in FIG. 2 with a portion of the marking (i.e., the text) substantially invisible to the observer and another portion of the marking (i.e., the non-text elements of the marking) partially faded to the observer upon being backlit by a light source.

Various inks may be used to form the marking according to various other exemplary embodiments. According to an exemplary embodiment, commercially available transparent and pigmented (i.e., colored) inks may be combined. For example, two-part pad printing inks available from Inkcups Now of Danvers, Massachusetts may be used (e.g., inks from the MB series such as MB70 transparent ink and MB 79/050 silver ink, among others).

Various proportions of the ink components may be used according to various exemplary embodiments, as described above. For example, different translucencies for the ink may be obtained by mixing the transparent and colored inks in proportions from approximately 60% transparent ink/40% colored ink by weight to 95% transparent ink/5% colored ink by weight. According to a particular exemplary embodiment, the ratio of the ink components is approximately 88.9% transparent ink to approximately 11.1% colored ink.

According to a particular exemplary embodiment, 40 grams of MB79 transparent ink are mixed with 5 grams of MB79/050 silver ink, along with 20% thinner (e.g., MS thinner commercially available from Inkcups Now of Danvers, Massachusetts) and a 4:1 mixture of 1000-H Hardener, also commercially available from Inkcups Now.

The content and thickness of the ink can vary, depending upon the requisite opacity and image uniformity of the marking on the lens when not lit, and the required light emission through the lens when backlit. Preferably, the ink is applied in a single application to achieve the requisite opacity and image uniformity. According to other exemplary embodiments, multiple applications of the ink may be used.

Figure 10:
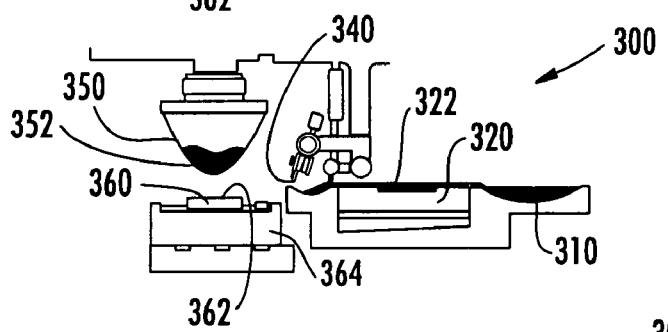
FIG. 10 is a schematic view of the system shown in FIG. 7 showing the positioning of the transfer pad over a substrate (e.g., a lens).
Figure 11:
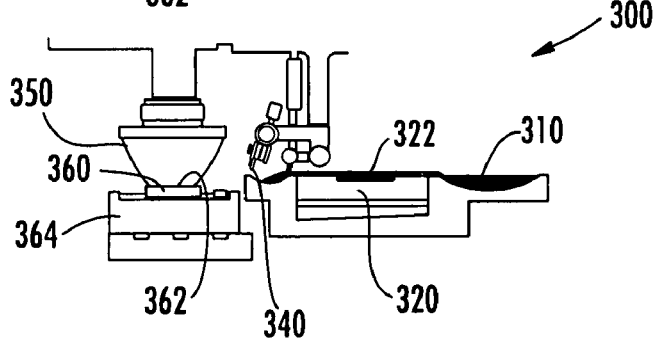
FIG. 11 is a schematic view of the system shown in FIG. 7 showing the application of ink to the substrate using the transfer pad.
Figure 12:
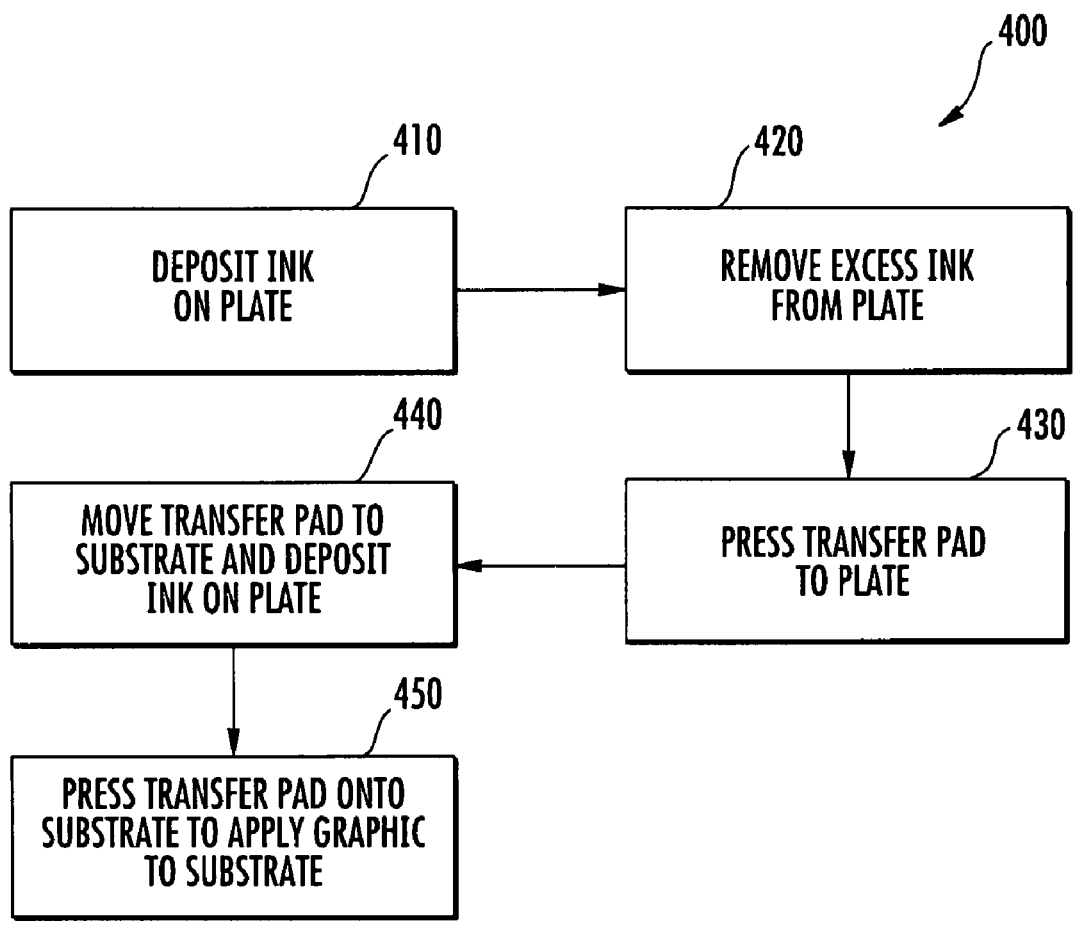
FIG. 12 is a flowchart illustrating steps in a method of preparing a lighting assembly according to an exemplary embodiment.

FIG. 12 is a flowchart describing steps in an exemplary method 400 of producing lenses for lighting assemblies, and FIGS. 7-11 illustrate a system 300 for carrying out the steps in such method.

Figure 7:
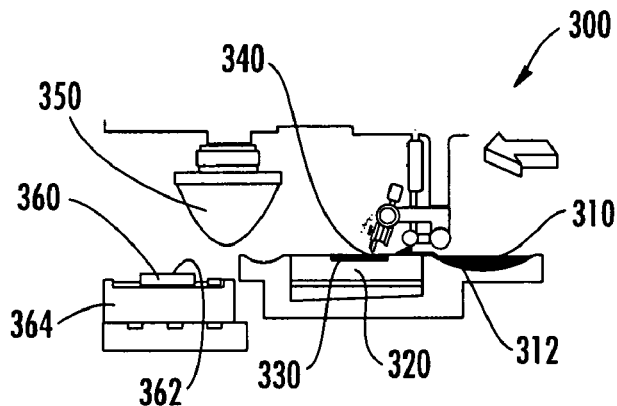
FIG. 7 is a schematic view of a system for applying markings to lighting assemblies according to an exemplary embodiment showing the application of ink to a template.

In a step 410 shown in FIG. 7, ink is taken from an ink well 310 and provided over an entire surface of a transfer plate or cliché 320 using a mechanism 312 (e.g., a sprayer, spatula, etc.) that is configured to move from the ink well 310 across the surface of the cliché 320. The cliché 320 includes one or more depressions 330 (e.g., cutouts, troughs, wells, etc.) formed in an upper surface thereof that are arranged such that their design is similar or identical to that of the marking to be applied to the lens of the lighting assembly. When the ink is applied to the surface of the cliché 320, the ink fills the depressions 330.

Figure 8:
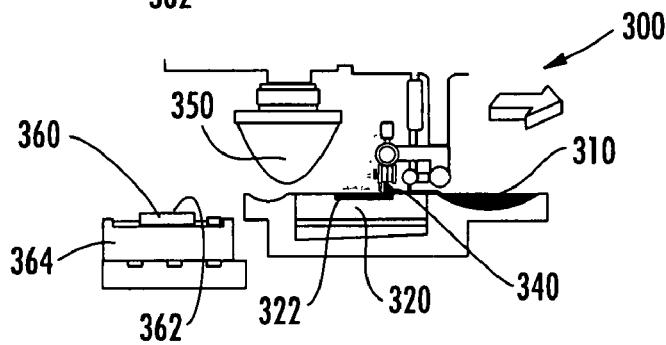
FIG. 8 is a schematic view of the system shown in FIG. 7 showing the removal of excess ink from the template.

In a step 420 shown in FIG. 8, a member or element 340 (e.g., a doctor blade) moves across the surface of the cliché 320 to remove excess ink, leaving only the ink that fills the depressions 330 to form a pattern 322. According to an exemplary embodiment, the doctor blade 340 and the mechanism 312 move together across the surface of the cliché 320, although according to other exemplary embodiments, such elements may be separately controlled. As shown in FIG. 8, the doctor blade 340 moves from left to right to remove excess ink from the cliché 320.

Figure 9:
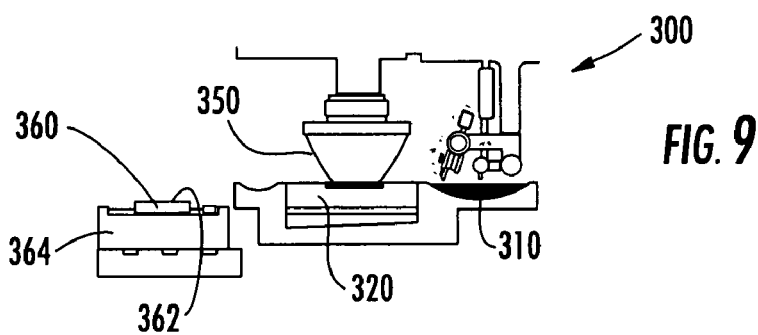
FIG. 9 is a schematic view of the system shown in FIG. 7 showing the application of ink to a transfer pad.

In a step 430 shown in FIG. 9, a transfer pad or tampo 350 is pressed down onto the cliché. The ink included in the depressions 330 is then transferred to the transfer pad 350. The ink pattern 352 (see FIG. 10) on the transfer pad 350 will then be used to form markings on a lens.

In a step 440 shown in FIG. 10, the transfer pad 350 is positioned such that it is directly over a surface 362 of a substrate 360 (e.g., a lens), which is provided on a stand 364. According to an exemplary embodiment, concurrently with the movement of the transfer pad 350 (e.g., to the left as shown in FIG. 10), ink from the ink well 310 is applied to the cliché 320. According to other exemplary embodiments, the application of ink to the cliché may be accomplished in a separate operation.

In a step 450 shown in FIG. 11, the transfer pad 350 is pressed onto the surface 362 of the substrate 360 such that the ink pattern 352 is transferred onto the surface 362. Once the transfer pad 350 is lifted off of the surface 362, the marking will be left behind on the substrate surface. A standard clear lens hardcoat may optionally be applied over the marking, such as UVT200 hardcoating commercially available from Redspot of Evansville, Ind.

According to other exemplary embodiments, other methods of providing ink on a lens of a lighting assembly may be used. For example, the ink may be provided by spraying, airbrushing, screen printing, ink jet printing, lithography, static image transfer, or any other suitable method.

It should be understood that the concepts described herein may apply not only to lighting assemblies used in vehicles, but also to lighting assemblies not used in vehicles (e.g., signs, street lights, flashlights, home interior and exterior lamps, machinery, medical devices, and other consumer products where lighting assemblies are used).

It should be noted that references to "top" and "bottom" in this description are merely used to identify various elements as are oriented in the FIGURES. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the lighting assemblies as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A lens for a vehicle light assembly having at least one ink marking provided thereon, at least a portion of the ink marking configured to be generally opaque to a viewer when a light source in the light assembly is not illuminated and to not be opaque to a viewer when the light source is illuminated, wherein the ink marking comprises an ink composition comprising a transparent ink and a pigmented ink, wherein the ink marking is further configured to allow more incident light to pass through a first portion of the ink marking than through a second portion of the ink marking when the light source is activated.

2. The lens of claim 1, wherein the portion of the ink marking appears invisible to an observer when the light source is illuminated.

3. The lens of claim 1, wherein the portion of the ink marking appears faded to an observer when the light source is illuminated.

4. The lens of claim 1, wherein at least a portion of the light from the light source incident upon the ink marking passes through the ink marking when the light source is illuminated.

5. The lens of claim 1, wherein at least 30 percent of the light from the light source incident upon the ink marking passes through the ink marking when the light source is illuminated.

6. The lens of claim 1, wherein the entire ink marking is formed of the same ink composition.

7. The lens of claim 1, wherein the ink marking comprises at least one of a graphical element and a text element.

8. The lens of claim 1, wherein the lens comprises a polymeric material.

9. The lens of claim 1, wherein the lens is configured for use in a vehicle brake light.

10. The lens of claim 1, wherein the lens is configured for use in a center high mounted stop light for a vehicle.

11. A lighting assembly comprising:
a light source;
a lens; and
a marking provided on the lens, the marking comprising an ink that is opaque to a viewer until the light source is activated, wherein the ink is configured to allow at least a portion of the light from the light source to pass through the marking, and wherein the ink comprises a transparent ink and a pigmented ink, wherein the marking is configured to allow more incident light to pass through a first portion of the marking than through a second portion of the marking when the light source is activated.

12. The lighting assembly of claim 11, wherein the light source comprises at least one light emitting diode.

13. The lighting assembly of claim 11, wherein the lighting assembly is a center high mounted stop light for a vehicle.

14. The lighting assembly of claim 11, wherein the marking comprises at least one of a graphical element and a text element.

15. The lighting assembly of claim 11, wherein the marking is provided on an inner surface of the lens.

16. The lighting assembly of claim 11, wherein at least a portion of the marking is configured to disappear to an observer when the light source is activated.

17. A method for producing a lighting assembly comprising:
providing an ink composition comprising a transparent ink and a pigmented ink; and
applying the ink composition to a surface of a lens;
wherein the ink composition is configured to be opaque to a viewer until lit by a light source and to allow at least a portion of the light from the light source to pass through the ink, wherein the ink composition is configured to allow more incident light to pass through a first portion of the ink composition than through a second portion of the ink composition when the light source is activated.

18. The method of claim 17, wherein the step of providing an ink composition comprises providing the ink composition on a plate having at least one depression formed therein.

19. The method of claim 18, wherein the step of applying the ink composition comprises utilizing a transfer pad to transfer the ink from the plate to the lens.

20. The method of claim 19, further comprising removing excess ink from the plate before the step of applying the ink composition.

21. The method of claim 20, wherein the step of applying the ink comprises at least one of spraying, airbrushing, screen printing, ink jet printing, lithography, and static image transfer.

22. The method of claim 17, wherein the step of applying the ink composition to the surface of the lens comprises providing an emblem on the lens.

23. The method of claim 22, wherein the emblem comprises at least one of a graphical element and a text element.

24. The method of claim 17, wherein the lens is configured for use in a vehicle light assembly.

* * * * *